United States Patent
Oksman

(10) Patent No.: US 9,515,857 B2
(45) Date of Patent: Dec. 6, 2016

(54) METHODS AND SYSTEMS FOR ADAPTIVE COMMUNICATION

(75) Inventor: Vladimir Oksman, Morganville, NJ (US)

(73) Assignee: Lantiq Beteiligungs-GmbH & Co. KG, Neubiberg (DE)

(*) Notice: Subject to any disclaimer, the term of this patent is extended or adjusted under 35 U.S.C. 154(b) by 1798 days.

(21) Appl. No.: 11/599,210

(22) Filed: Nov. 14, 2006

(65) Prior Publication Data

US 2008/0089436 A1    Apr. 17, 2008

Related U.S. Application Data

(60) Provisional application No. 60/850,791, filed on Oct. 11, 2006.

(51) Int. Cl.
*H04L 25/49*    (2006.01)
*H04L 25/03*    (2006.01)
*H04L 25/02*    (2006.01)

(52) U.S. Cl.
CPC ..... *H04L 25/03343* (2013.01); *H04L 25/0288* (2013.01)

(58) Field of Classification Search
CPC ............. H04L 25/03343; H04L 5/0007; H04L 27/2601; H04L 27/2613; H04L 27/2626; H04B 3/32
USPC .................................................. 375/257, 296
See application file for complete search history.

(56) References Cited

U.S. PATENT DOCUMENTS

| | | | | |
|---|---|---|---|---|
| 5,903,608 | A | * | 5/1999 | Chun ............................ 375/260 |
| 6,400,761 | B1 | * | 6/2002 | Smee et al. ................... 375/232 |
| 6,912,208 | B2 | | 6/2005 | Zimmerman et al. |
| 2003/0086514 | A1 | * | 5/2003 | Ginis et al. ................... 375/346 |
| 2003/0169682 | A1 | * | 9/2003 | Chen et al. ................... 370/206 |
| 2005/0259565 | A1 | * | 11/2005 | Fujii et al. .................... 370/203 |
| 2007/0004286 | A1 | * | 1/2007 | Hobbel ......................... 439/676 |

OTHER PUBLICATIONS

"A Low Complexity Coordinated FEXT Cancellation for VDSL", Amir Leshem and Li Youming, Electronics, Circuits and Systems, 2004, ICECS 2004, Proceedings of the 2004 11$^{th}$ IEEE International Conference, 4 pgs.

* cited by examiner

*Primary Examiner* — David S Huang
(74) *Attorney, Agent, or Firm* — Eschweiler & Associates, LLC

(57) ABSTRACT

Various embodiments of the present invention relate to methods and systems for combating noise in a communication system comprising a number of transmission lines. In one method, using noise coefficients are used to pre-distort data that is to be transmitted over one of the number of transmission lines. The noise coefficients are dynamically adjusted as a function of synchronized signals that are synchronized across the number of transmission lines. Other methods and systems are also disclosed.

16 Claims, 8 Drawing Sheets

METHODS AND SYSTEMS FOR ADAPTIVE COMMUNICATION

REFERENCE TO RELATED APPLICATIONS

This application claims the benefit of U.S. Provisional Application No. 60/850,791, filed Oct. 11, 2006 the contents of which are herein incorporated by reference in their entirety.

FIELD OF THE INVENTION

The present invention relates generally to communication methods and systems, and more specifically to adaptive communication service in a communication system.

BACKGROUND OF THE INVENTION

In today's business climate, industry fortunes rise and fall on whether information is exchanged in an efficient manner. Cell phones, pagers, and the Internet have thrived because each technology allows businesses to exchange critical market information at a moment's notice. In addition, such technologies allow individuals to keep abreast of recent developments with family and friends. In short, many segments of our modern society require instant access to accurate, up-to-the-minute information.

Companies spend significant resources to develop modern communication systems that provide people with such information. As networked communication systems have matured, data rates have increased from 20 kilobits per second (kb/s) in 1975, to 100 Mb/s with modern VDSL. In other words, customers in today's "information age" can receive data approximately 5,000 times as fast as network customers of thirty years ago. To bring customers into this modern "information age", developers have spent billions of dollars to develop network technologies such as Digital Subscriber Line (DSL) technology, for example. To continue to increase data rates at such a remarkable pace, communication systems developers will likely be required to spend significant capital resources for many years to come.

The data rate at which data is successfully transferred over a communication system generally decreases as the noise increases. Thus, communication systems strive to minimize the effects of various types of noise, such as continuous noise, impulse noise, crosstalk, or combinations thereof.

While the existing methods and systems for combating noise and for correcting noise-related data transfer errors are sufficient for their stated purpose, the methods and systems are not sufficient to accurately account for changes in noise (e.g., crosstalk) during communication service. Thus, improved methods and systems are needed.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

Various embodiments of the present invention relate to methods and systems for combating noise in a communication system comprising a number of transmission lines. In one method, noise coefficients are used to pre-distort data that is to be transmitted over one of the number of transmission lines. The noise coefficients are dynamically adjusted as a function of signals that are synchronized across the number of transmission lines. Other methods and systems are also disclosed.

The following description and annexed drawings set forth in detail certain illustrative aspects and implementations of the invention. These are indicative of but a few of the various ways in which the principles of the invention may be employed.

BRIEF DESCRIPTION OF THE DRAWINGS AND APPENDIX

DETAILED DESCRIPTION OF THE INVENTION

Figure 1:
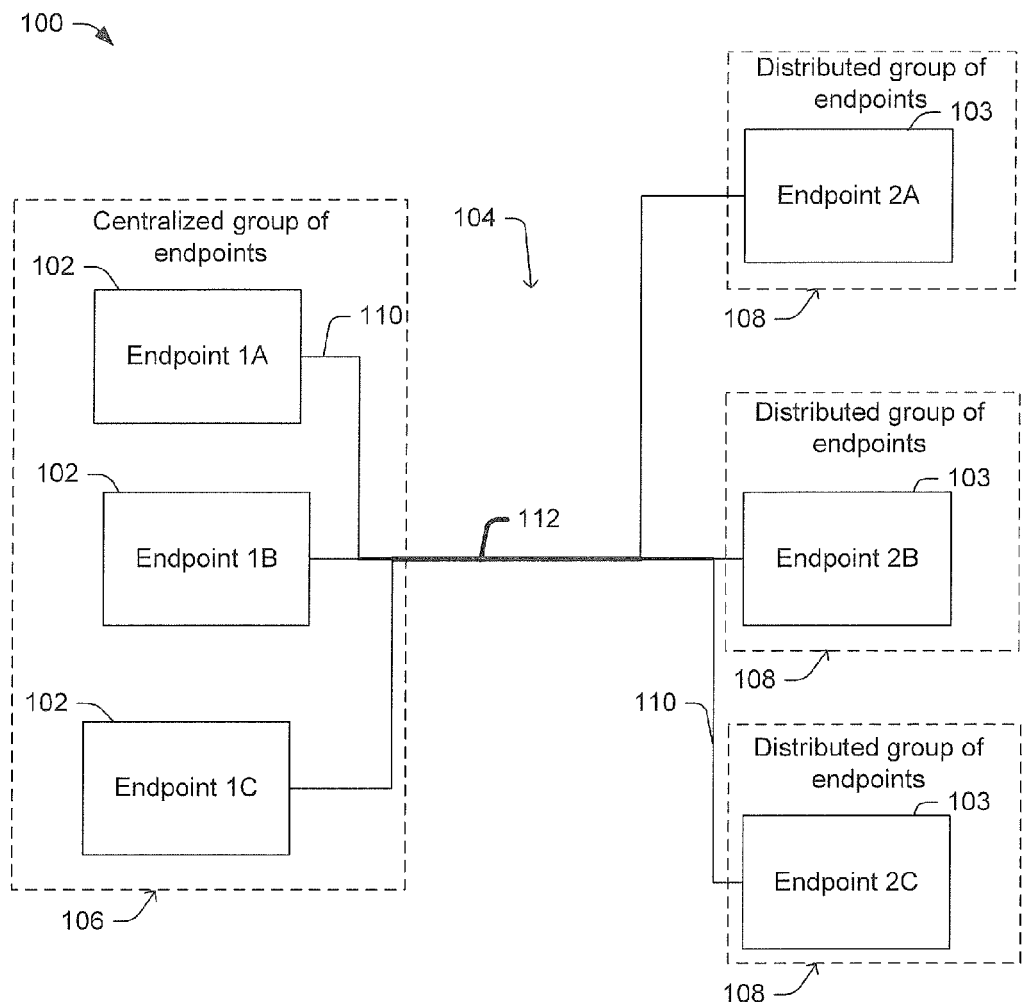
FIG. 1 is a block diagram of one embodiment of a communication system.

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

Aspects of the present invention may relate to communication systems, including point-to-point communication systems, point-to-multipoint communication systems, and multipoint to multipoint systems, any of which transfer data over one or more transmission lines. FIG. 1 shows one embodiment of a communication system 100. The communication system 100 comprises a number of first endpoints 102 that are configured to communicate with respective second endpoints 103 via respective transmission lines 104. In the illustrated embodiment, each endpoint is coupled to one end of a transmission line and can communicate with another endpoint, which is coupled to the other end of the transmission line 104. In various embodiments, the endpoints may be divided into a centralized group of endpoints 106 and a number of distributed endpoints 108.

In the illustrated embodiment, each endpoint 102,103 is coupled to an individual transmission line 110. At various portions in the system (e.g., in a cable binder), the transmission lines 110 are grouped into a bundled region 112, wherein a number of transmission lines are in close proximity, such that signals from adjacent transmission lines may cause electrical interference or noise with one another. In one embodiment, this noise could be cross-talk, such as near-end cross-talk (NEXT) or far-end cross-talk (FEXT). In various embodiments, each endpoint 102, 103 may be configured to account for this noise by dynamically adjusting noise coefficients that are used to pre-distort the data to be transmitted over the line. In one embodiment, the noise coefficients may be dynamically adjusted by selectively adjusting the power at which synchronized signals are transmitted over the line.

Figure 2:
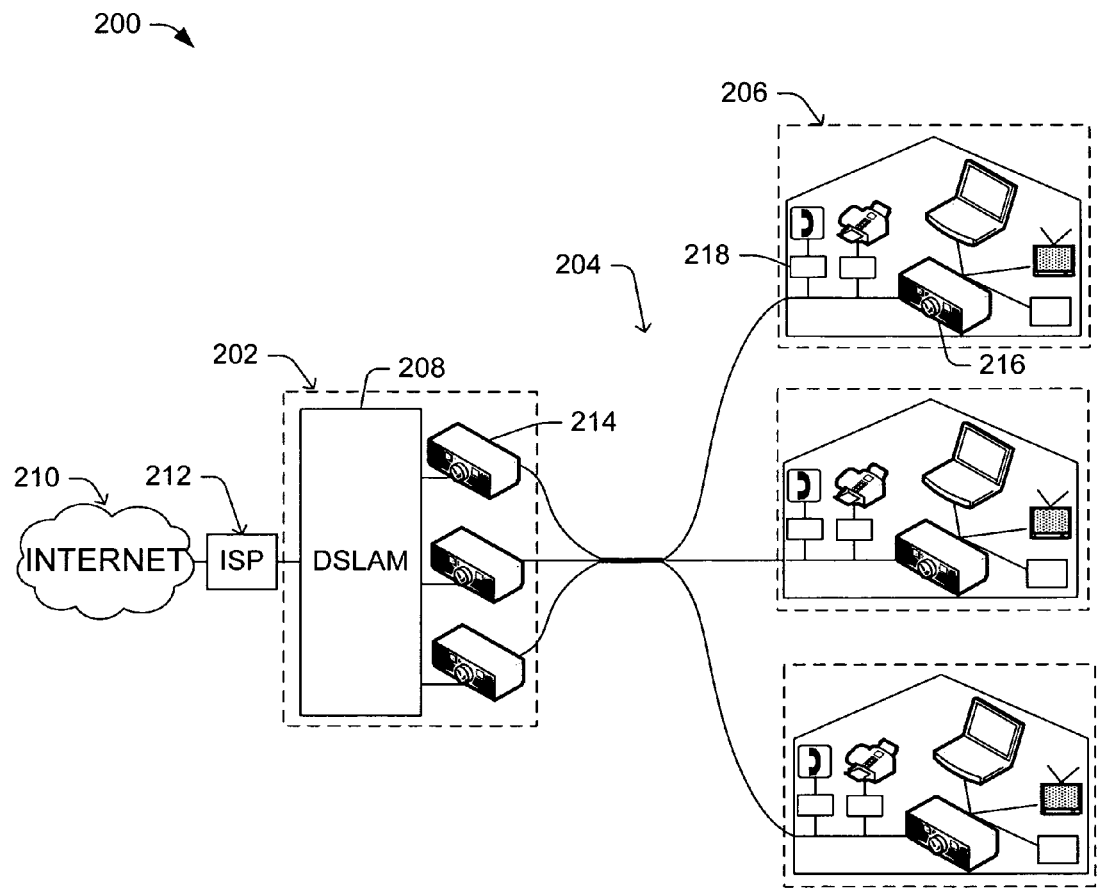
FIG. 2 is a block diagram of one embodiment of a communication system.

In one embodiment the communication system 100 could utilize Digital Subscriber Line (DSL) technology to transfer data, although it will be appreciated that the invention applies to other technologies over which data can be transferred between endpoints. As shown in FIG. 2, one DSL communication system 200 includes a centralized group of endpoints 202 comprising a central office (CO) that communicates over a number transmission lines 204 with a number of distributed endpoints 206 that each comprises a customer premises (CPE). As shown, a local Digital Subscriber Line Access Multiplexer (DSLAM) 208 receives high speed data from backbone fiber of the Internet 210 via an Internet Service Provider (ISP) 212 and distributes the data to modems 214 in the CO. Each modem 214 of the CO transfers data to and from a modem 216 at a CPE via a transmission line that comprises a twisted copper pair of wires. The modems 216 at the CPE can then distribute the high speed data to and from various network devices, including but not limited to: computers, televisions, personal digital assistants (PDA), phones, faxes, routers, home appliances, or other network devices. In typical DSL implementations, the modems 214, 216 will communicate via discrete multi-tone (DMT) or some other frequency-division technology. Because of the additional frequencies that may be present on the line, filters 218 are placed on phone lines that do not use the DSL service. These filters allow the non-DSL devices to still communicate effectively on the line, and prevent the non-DSL devices from being adversely affected by additional frequencies that may be present on the line due to DSL.

Figure 3:
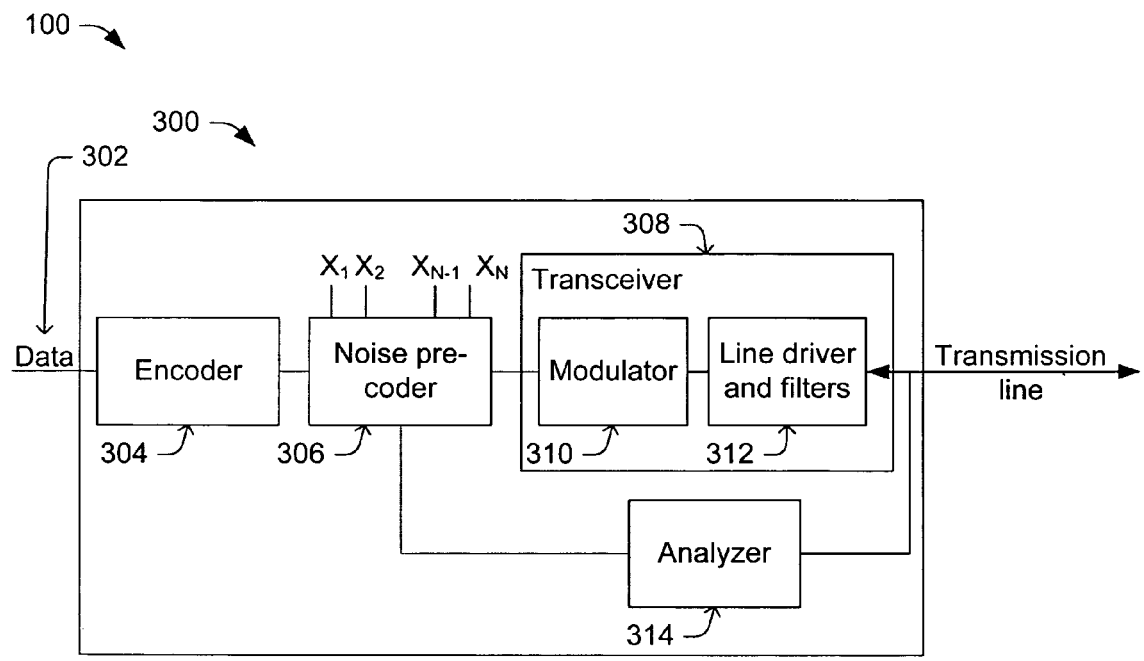
FIG. 3 is a block diagram of one embodiment of an endpoint of a communication system.
Figure 4:
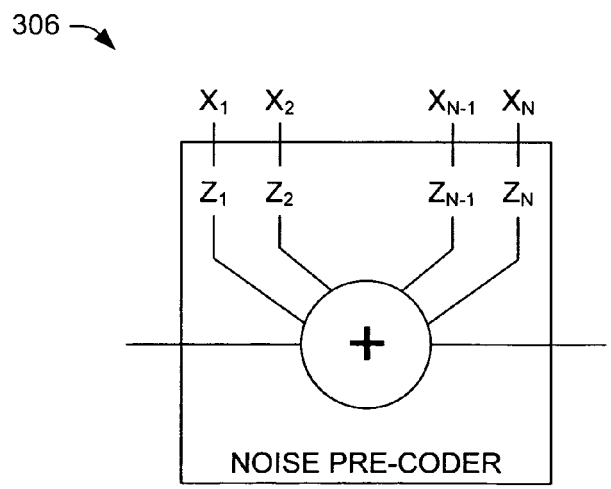
FIG. 4 is a functional diagram of one embodiment of a noise pre-coder.

FIGS. 3-4 show one embodiment for an endpoint 300 that is configured to combat noise by using synchronized signals or timing elements to dynamically adjust noise coefficients. In one embodiment the endpoint could be a DSL modem (e.g., modem 214 or 216), although in other embodiments the endpoints could be other devices. The endpoint 300 includes a source of data or some other signal 302 that is to be transmitted over the line; an encoder 304; a noise pre-coder 306; a transceiver 308 that comprises a modulator 310 and a line driver with appropriate filtering circuitry 312; and an analyzer 314 for analyzing noise on the line. The noise pre-coder 306 pre-distorts the data to be transmitted on the line before passing the data to the transceiver 308. In one embodiment this pre-distortion is performed to account for the noise that will actually be encountered on the line, and the data is received error-free or error-limited at another endpoint. Because the noise on the line may change in time (e.g., due to temperature or other variables), the present invention allows adjustments to noise coefficients that were previously unavailable in the art.

As FIG. 4 shows, the precoder 306 uses the signals $X_1$, $X_2, \ldots, X_{N-1}, X_N$ (which may be, for example, provided by the analyzer 314) to calculate noise coefficients $Z_1, Z_2, \ldots, Z_{N-1}, Z_N$, which are then used to pre-distort the data. In one embodiment, the individual noise coefficients could relate to FEXT due to bundled transmission lines in a cable binder. In one embodiment, for example, a cable binder could include twenty five transmission lines, each of which could cause interference (e.g., crosstalk) with one another. Thus, the first transmission line could experience crosstalk from electrical signals on the twenty four other transmission lines. Accordingly, the endpoints associated with the first transmission line could utilize twenty four noise coefficients, each of which pre-distorts the signal to be transmitted to account for FEXT due to one of the other twenty four transmission lines. The pre-coder could for example, effectively add the twenty four noise coefficients and transmit the data over the line in a manner that allows it to be received error-free.

Figure 5:
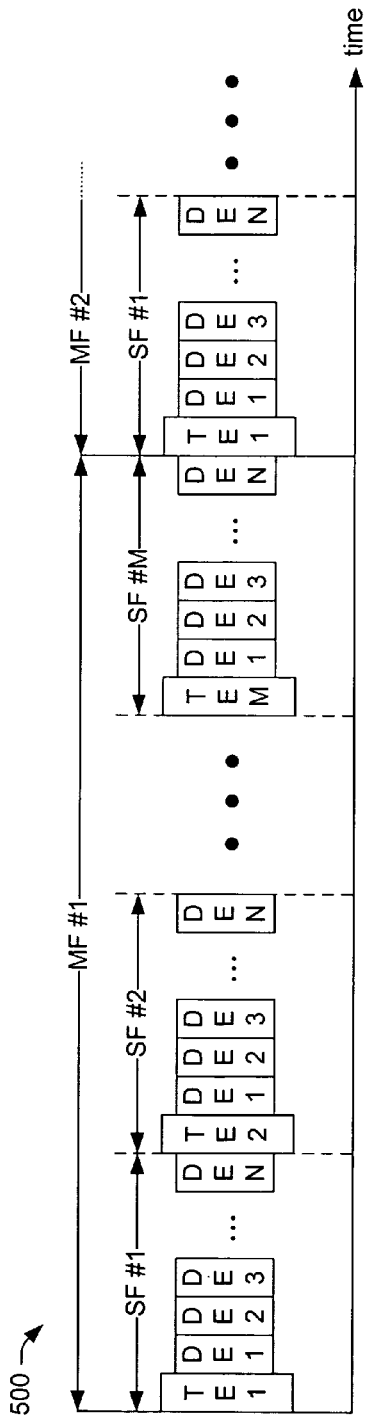
FIG. 5 is one embodiment of a signal stream.
Figure 6:
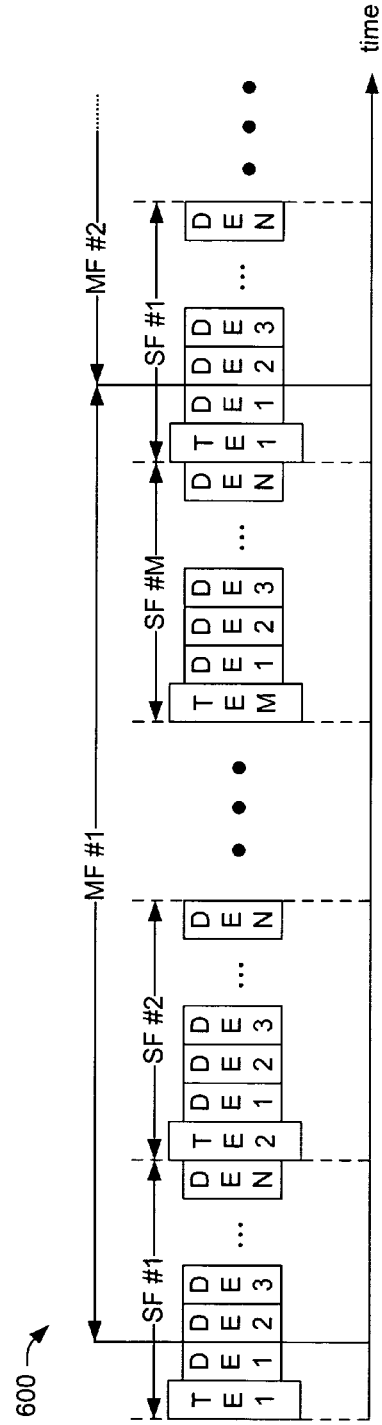
FIG. 6 is one embodiment of a signal stream.

In order to more fully appreciate how these noise coefficients are calculated and adjusted, FIG. 5 and FIG. 6 show embodiments of signal streams 500 and 600, respectively, that are communicated between endpoints 102, 103 of the communication system 100 over a transmission line 110, wherein the signal streams 500 and 600 comprise interspersed timing elements (e.g., TE1) and data elements (e.g., DE1). In the signal streams the timing elements are synchronized across a number of transmission lines. For example, the timing elements may be synchronized across the transmission lines included in the bundled region 112 (e.g., in a cable binder). In one embodiment, the endpoints of the centralized group 106 (e.g., CO) can facilitate the dynamic adjustment of noise coefficients by selectively controlling the power at which timing elements are transmitted, including turning specific timing elements on and off or otherwise varying the voltage of the timing elements at various times.

In embodiments where the signal stream comprises data elements interspersed with timing elements, the timing elements can be transmitted periodically after an integer number of data elements. The time period between two consecutive timing elements can be referred to as a Super Frame (SF).

Further a Macro Frame (MF) can include a fixed number of Super Frames. As shown in FIG. 6, it is not necessary that a Macro Frame starts at the same time as a Super Frame; however, Macro Frames generally include the same number of Super Frames. Also, the number of timing elements per Macro Frame is greater than or equal to the potential number of lines for which the noise coefficients are to be dynamically adjusted (e.g., the number of lines in a cable binder).

In one embodiment in which the communication system is a DSL system, the timing elements and data elements are symbols, in which one or more bits of data are encoded. Further, the timing elements could be Sync symbols and the data elements could be data symbols. Sync symbols can be used in DSL for synchronization, on-line reconfiguration, and other auxiliary purposes. Typically, Sync symbols do not carry user data, and all tones used for the Sync symbols are modulated by a pseudo random signal using QPSK modulation. The QPSK modulation is robust in that even strong crosstalk may have a limited impact on the Sync symbols on the line. In one ADSL embodiment, a Super Frame could be 68 data symbols, while in another VDSL2 embodiment, a Super Frame could be 255 data symbols. Other lengths for a Super Frame could also be used.

It will be appreciated that the illustrated communication system and other systems of the invention include suitable circuitry, state machines, firmware, software, logic, etc. to perform the various methods and functions illustrated and described herein. While methods may be illustrated and described as a series of acts or events herein, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of communication systems which are illustrated and described herein (e.g., communication system 100 in FIG. 1) as well as in association with other systems not illustrated, wherein all such implementations are contemplated as falling within the scope of the present invention and the appended claims.

Figure 7:
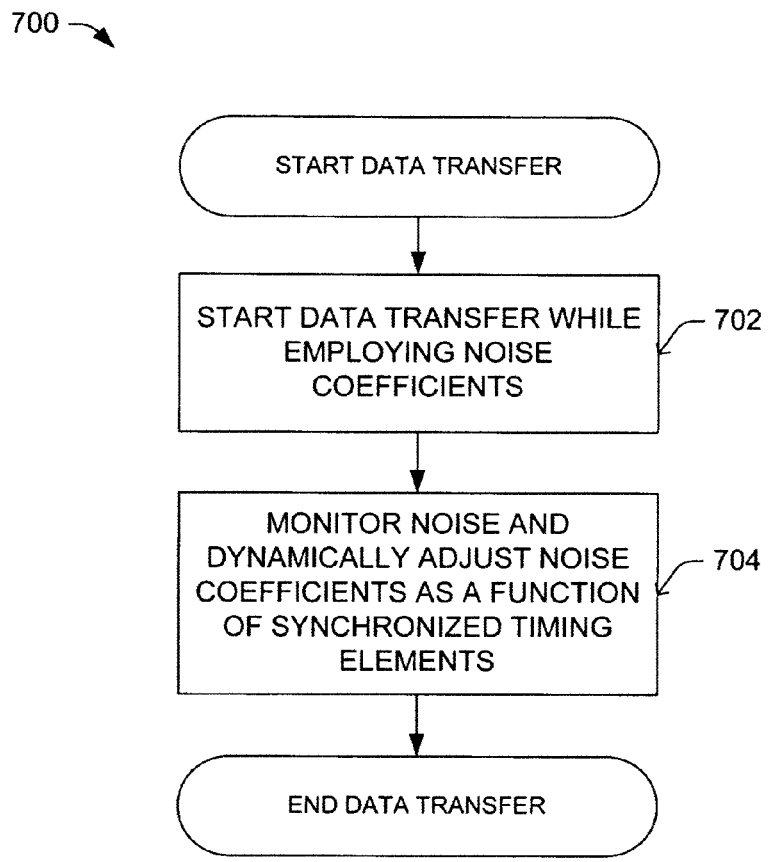
FIG. 7 is a flowchart of one embodiment of a method for dynamically adjusting noise coefficients.

Referring now to FIG. 7, one can see one embodiment of a method 700 for dynamically adjusting noise coefficients in a communication system. In one embodiment the noise coefficients can be used to pre-distort data to account for noise on the transmission line such that the data will be received their free or error-limited. One embodiment of the invention relates to the manner in which these noise coefficients are calculated and adjusted. In the illustrated method at 702, initial noise coefficients are employed at the start of data transfer. These initial noise coefficients are used to pre-distort the data to be transmitted on the line to account for the noise that will actually be encountered on the line, such that the data is received error-free or error-limited at an endpoint that receives the data. During data transfer at 704, the noise on the line is continuously monitored and the noise coefficients are dynamically adjusted as a function of synchronized signals or timing elements. Thus, the noise coefficients can be dynamically adjusted in a manner previously unavailable in the art. In the illustrated method, noise coefficients are dynamically adjusted during data transfer, although it will be appreciated that the noise coefficients could also be dynamically adjusted during other stages of communication (e.g., handshake, initialization, etc.).

Figure 8:
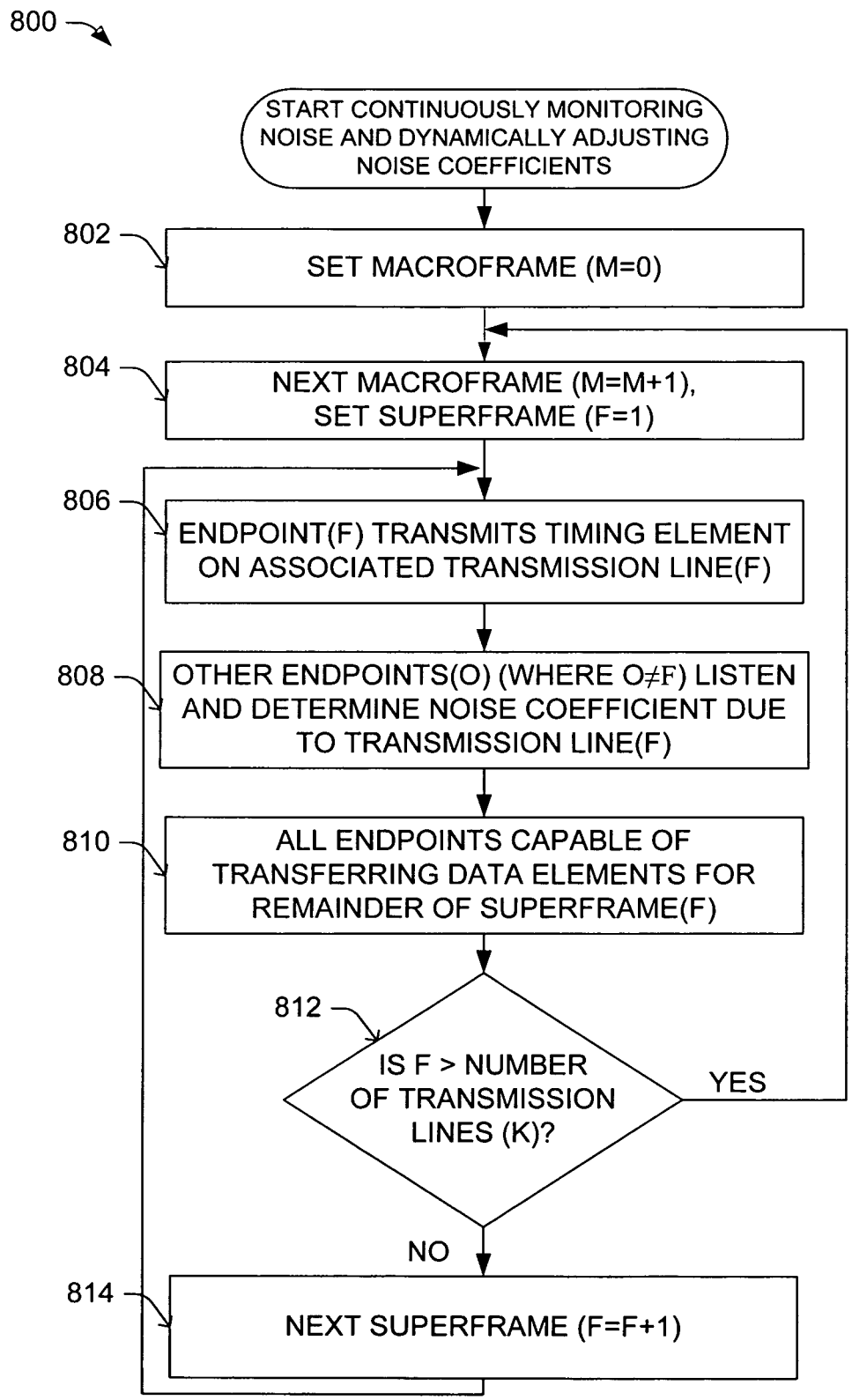
FIG. 8 is a flowchart of one embodiment of a method for continuously monitoring noise and dynamically adjusting noise coefficients.

FIG. 8 shows a more detailed method 800 that utilizes synchronized symbols to monitor noise and dynamically adjust the noise coefficients. In particular, FIG. 8 can relate to a system in which K transmission lines transfer data between several endpoints, wherein K is any integer number. In one embodiment, the number of timing elements within each Macroframe is chosen such that each timing element corresponds to a particular transmission line, in other words there can be at least K timing elements within each Macroframe. By setting the timing elements in this manner, the system can provide a situation where one transmission line can generate FEXT into another transmission line. The system can then identify the FEXT and estimate the adjusted noise coefficients capable of pre-distorting the data to account for the FEXT.

In 802, M (which can be thought of as an index for the current Macro Frame within a given signal stream), is initialized. For example, M can be set to zero in one embodiment.

In 804, M is incremented and F is initialized, wherein F can be thought of as an index for the current SuperFrame within a given Macroframe.

In 806, one endpoint transmits a timing element or other synchronized signal on its associated transmission line during the synchronized time period allocated for such transmission. In one embodiment, the endpoint is a modem at a CO.

In 808, which can occur while the one endpoint is transmitting the timing element, the other endpoints in the system "listen" for noise on the line. If the other endpoints detect noise on the line, the endpoints analyze the noise and determine the noise coefficient due to the endpoint's transmission. The other endpoints can then, for example, update their own noise coefficients and convey this information back to the modem CO using a management communication channel.

In 810, for the remainder of the given Superframe, all endpoints are capable of transferring data over transmission lines associated therewith. In one embodiment, the endpoints can transfer this data via data element or data symbols (e.g., data elements as shown in FIG. 5 or FIG. 6).

In 812, the endpoints determine whether the current time corresponds to the end of a Macroframe by determining whether F (the Superframe index) is greater than the total number of transmission lines that can potentially cause electrical interference. This total number of transmission lines may be determined at startup or may adjusted dynamically.

If the current time corresponds to the end of a Macroframe (YES at 812), then the method returns to 804, wherein another Macroframe is processed and wherein the Superframe index S is set back to 1. If the current time does not correspond to the end of a Macroframe (NO at 812), then the method processes the next Superframe in the Macroframe in step 814.

Figure 9:
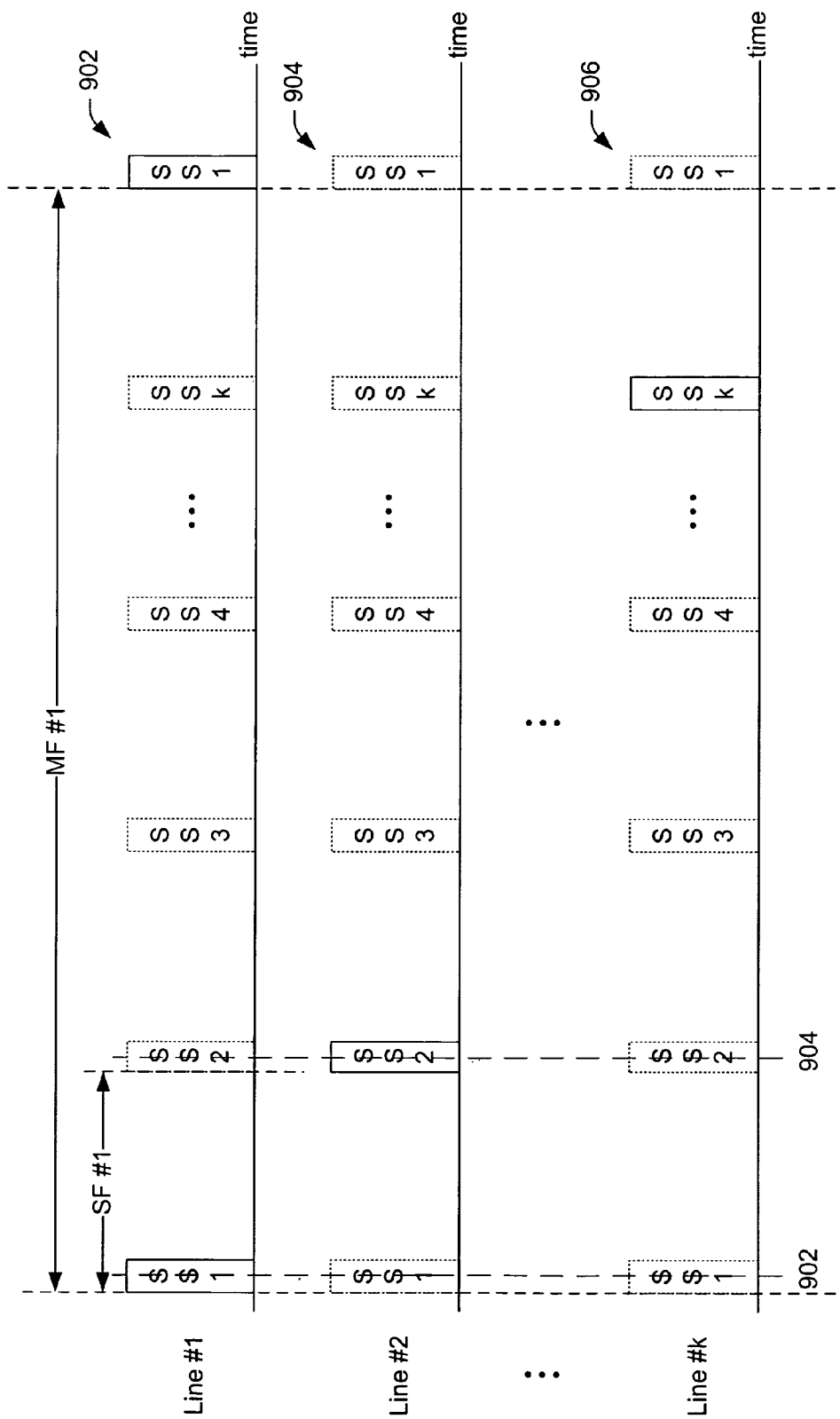
FIG. 9 is a chart of one embodiment in which timing elements are transferred over transmission lines.

Referring now to FIG. 9, one can see another embodiment of the present invention in which individual signal streams (902, 904, and 906) are transmitted over the individual transmission lines (line #1, line #2, and line #k, respectively). Although the illustrated signal streams show only Sync Symbols (SSs), which are one type of timing element, various signal streams also include data symbols or other data elements interspersed with the SSs as previously discussed (e.g., FIGS. 5-6). In FIG. 9, each Macroframe contains k Superframes, wherein k can be any integer such that the number of superframes in a macroframe relates to the number of transmission lines in the system.

Although FIG. 9 is now described with respect to a DSL communication system, it will be appreciated that its teachings can be applied other technologies and systems.

At time 902, a CO modem associated with line #1 transmits a SS over line #1. Thus, the solid SSs in FIG. 9 represent SSs transmitted by a modem over a transmission line associated with that modem. One or more CPE modems associated with the other lines detect the known pattern transmitted in the SS and evaluate the current FEXT due to every tone of the SS in the MF. Thus, the dashed SSs indicate that the modems associated with that line are "listening" to the noise due to the other transmitted SSs. The modems at the CPE convey the FEXT estimations to the modem at the CO. The modem at the CO then uses these estimations to establish or update noise coefficients $Z_1$, $Z_2$, ..., $Z_N$.

At time 904, another CO modem associated with line #2 transmits a SS over line #2, and the other modems at the CPE detect the known pattern and evaluate the current FEXT due to the SS transmitted on line #2.

This process of selectively adjusting a power at which one SS is transmitted and listening for the noise generated therefrom can continue throughout data transfer or any other suitable time. After line #k transmits a SS over line k and the other modems "listen" for the FEXT due to that SS, the modems are finished with MF #1 and move on to the next MF.

In one embodiment, the FEXT power at tone n of the SS #m from the compensated N loops will equal:

$$FEXT_n(m) = a_{n1} * \text{fext}_{n1} + a_{n2} * \text{fext}_{n2} + \ldots + a_{nN} * \text{fext}_{nN},$$

wherein there are N+1 crosstalkers in the binder, and $a_{nk}$ are multitudes of the tone n at the transmitter. One way to find FEXT coupling coefficients $\text{fext}_{nk}$ is to zero all other ($a_{ni}=0$, when i≠k and $a_{ni}=1$, when i=k). Another way is to perform at least N−1 estimations with different combinations of $a_{nk}$ involved.

Figure 10:
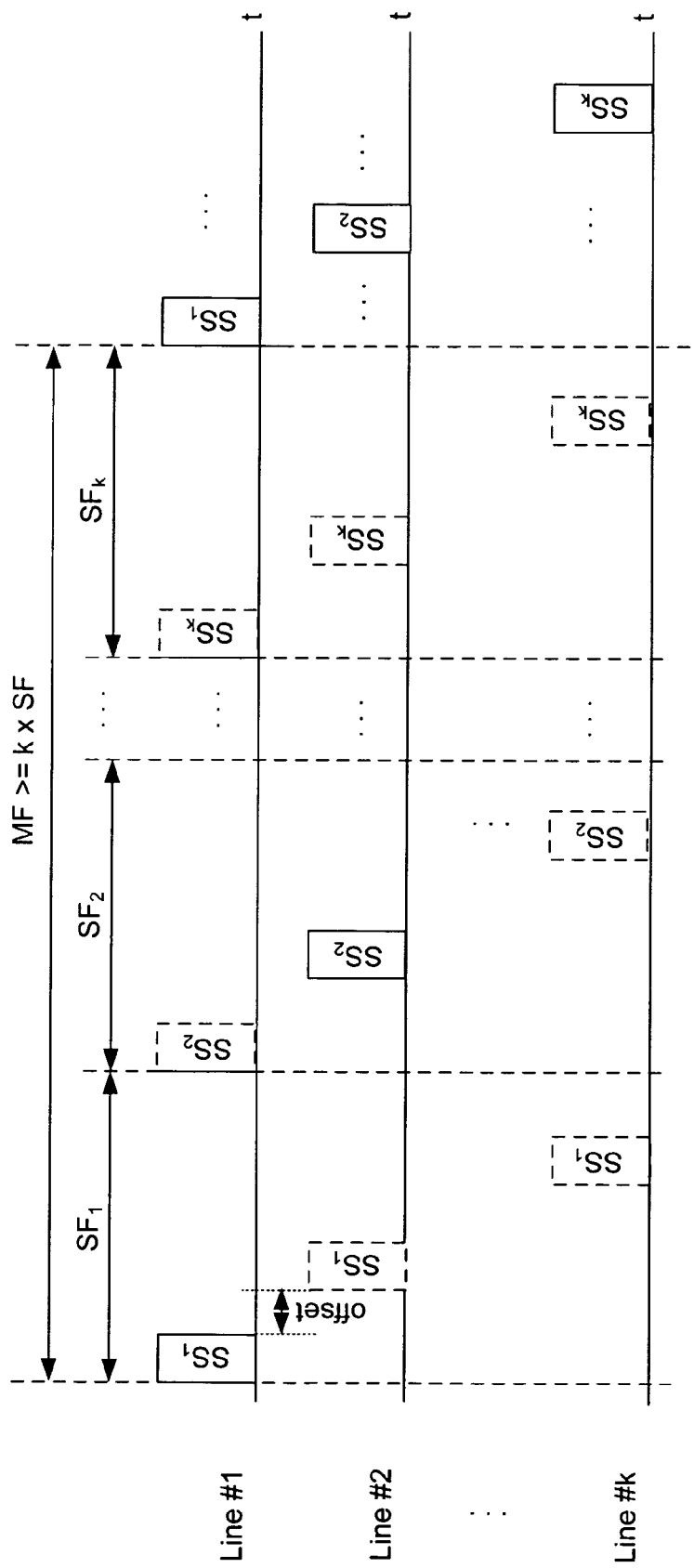
FIG. 10 is a chart of one embodiment in which timing elements are transferred over transmission lines.

FIG. 10 shows another embodiment where the SSs are offset by a particular number of symbols relative to the transmission lines. The SSs on any given transmission line, however, are still separated by an integer number of symbols equal to the length of a SF. For example, between line #1 and line #2, an offset is illustrated. This offset may be the same between subsequent transmission lines as well (e.g., line #2 and line #3), or may be different relative to those transmission lines. Nonetheless, the positions of SSs in subsequent transmission lines are separated by pre-defined offsets of pre-defined integer number of symbols. This arrangement allows each particular modem at the subscriber side (CP side) to use shifts between MFs on different lines to identify the exact timing position of the SS transmitted over any particular subsequent line and evaluate the FEXT coupling coefficients from this line using the known signal pattern transmitted during the SS. Thus, SF is typically "synchronized" across the transmission lines. It will be appreciated that the term "synchronized" includes both SSs, SFs and MFs that are communicated at the same time across all lines, as well as SSs, SFs and MFs that are communicated at different times (with different predefined offsets), but which are separated by a constant SF value in each line.

In various embodiments the synchronized timing elements could be transmitted on a single predefined tone, while in other embodiments the synchronized timing elements could be transmitted over a number of signals or symbols according to a predefined pattern. In one embodiment, a specific pattern or power variation is applied to all tones of the SS. In other embodiments, these patterns may be applied on specific tones of SS during the MF, while the patterns may be applied on other tones in the next MF.

In other various embodiments, specific tones or pre-defined DMT symbols in the Superframe could be subject to the same patterns or power level variations. For example, tones from $n_1$ to $n_k$ in the first DMT symbol of the Superframe in line #1 are set to specific constellation point, while in all other lines these tones are zeroed. Tones $n_1$ to $n_k$ in the second DMT symbol of the Superframe in line #2 are set to specific constellation point, while in other lines the tones are zeroed, and so on. During N DMT symbols all N lines involved could measure FEXT coupling. During the next N symbols another group of k tones may be used. If the maximum number of tones used is Z, N*Z/k DMT symbols could be used with reduced number of tones. This reduces the bit rate during the time period in which FEXT is estimated, which is not the case when SSs are used.

In one embodiment, the centralized group of endpoints (e.g., CO) has control of the power and patterns at which timing elements or SSs are transmitted within a MF. For example, the CO may reduce power by 10 dB for all SS except SS#1 in loop #1, all SS except SS#2 in loop #2, etc. The receiver of each line estimates the received SS and computes the noise coefficient for each tone and sends it to the CO. The CO can use these values to update the noise coefficients.

In one embodiment, a new transmission line in a cable binder can be turned on via a signal. The signal can be synchronized with the other timing elements. Thus, the other lines can measure the noise coefficients due to the new line and set their noise pre-coders accordingly. Further, the addition of the new line can increase the power at which all symbols are transmitted, which allows initialization. During the initialization, a modem associated with new line updates the noise coefficients from the other lines and sets its noise pre-coder. As the pre-coder is set, the modem can transition to Showtime.

Although the invention has been illustrated and described with respect to one or more implementations, alterations and/or modifications may be made to the illustrated examples without departing from the spirit and scope of the appended claims. For example, although endpoint 300 may be a DSL modem in one embodiment, an endpoint could also manifest itself in various forms, depending on the implementation. For example, in one embodiment, the endpoint could be located at a customer's residence in the form of a residential gateway (RG) or a DSL modem (CPE). In one embodiment, the endpoint could comprise any one of or a combination of home appliances or other electrical products including, but not limited to: a computer, a television or another video system, a phone, a cell phone, a videoconferencing device, a refrigerator, a camera, a music player, a fax machine, and the like.

In addition, illustrate transmission lines could include, but are not limited to: wireline transmission lines, wireless transmission lines, and combinations thereof. Wireline transmission lines could include: (e.g., twisted pair of copper wires), cable transmission lines (e.g., coax cable), and optical transmission lines. Any such transmission lines could support single or multi-carrier communication.

In particular regard to the various functions performed by the above described components or structures (blocks, units, assemblies, devices, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for combating noise in an adaptive communication system, comprising:
    using noise coefficients to pre-distort data that is to be transmitted over one of a number of transmission lines; and
    dynamically adjusting the noise coefficients as a function of sync symbols that are synchronized across the number of transmission lines, wherein a power at which one or more of the sync symbols are transmitted is selectively adjusted between non-zero values to continuously generate noise by transmitting the one or more sync symbols, such that the noise associated with one of the transmission lines is uniquely analyzed to facilitate dynamically adjusting the noise coefficients.

2. The method of claim 1, wherein data symbols are interspersed with the sync symbols for a given subcarrier as the sync symbols are transmitted over the number of transmission lines.

3. The method of claim 1, wherein the sync symbols repeat at a regular interval related to the number of transmission lines in the system.

4. The method of claim 1, wherein the one transmission line communicates the data between a centralized group of endpoints and at least one distributed endpoint.

5. A method of estimating noise in a communication system, comprising:
   providing a number of signal streams over a respective number of transmission lines, wherein individual signal streams are associated with individual transmission lines, and wherein the individual signal streams comprise timing elements that are synchronized over the number of signal streams;
   relative to a timing element of a first individual signal stream that is associated with a first of the number of transmission lines, altering a power at which the timing elements of the other individual signal streams are provided on the other transmission lines;
   determining a noise coefficient that relates to the first transmission line based on crosstalk, if any, caused by the timing element of the first transmission line on the other transmission lines; and
   using the noise coefficient to pre-distort data to be transmitted over the first transmission line,
   wherein the timing elements comprise sync symbols that are synchronized over the number of transmission lines as a function of a superframe and a predefined offset.

6. The method of claim 5, further comprising:
   using the noise coefficient to pre-distort data to be transmitted over the other transmission lines.

7. The method of claim 5, wherein the noise coefficient is determined at a distributed endpoint, and wherein the noise coefficient is communicated from the distributed endpoint over the one of the transmission lines to a centralized endpoint.

8. The method of claim 5, wherein the individual signal streams further comprise: data elements that are interspersed between the timing elements.

9. A communication system, comprising:
   a first endpoint configured to pre-distort data by using noise coefficients and transmit the pre-distorted signal over a transmission line;
   a second endpoint configured to receive the pre-distorted signal via the transmission line and to recover the data;
   wherein the first and second endpoints are configured to cooperatively and dynamically adjust the noise coefficients as a function of sync symbols that are transmitted over the transmission line;
   additional transmission lines that are associated with additional first endpoints and additional second endpoints, respectively;
   wherein additional timing elements are transmitted between the additional first and second endpoints over the additional transmission lines, and wherein the additional timing elements are synchronized with the sync symbols,
   wherein the additional timing elements comprise additional sync symbols that are synchronized over the number of additional transmission lines as a function of a superframe and a predefined offset.

10. The system of claim 9, wherein the sync symbols have data elements interspersed therebetween, and wherein the additional timing elements have data elements interspersed therebetween.

11. The system of claim 9, wherein the sync symbols and the additional timing elements repeat at a regular interval related to a number of transmission lines in the system.

12. A communication system, comprising:
   a number of first endpoints configured to pre-distort respective data by using noise coefficients and transmit respective pre-distorted signals over a number of respective transmission lines;
   a number of second endpoints configured to receive the respective pre-distorted signals via the number of respective transmission lines and to recover the respective data; and
   means to cooperatively and dynamically adjust the noise coefficients as a function of sync symbols that are synchronously transmitted over the respective number of transmission lines,
   means to adjust a power at which one or more of the sync symbols are transmitted between non-zero values to continuously generate noise by transmitting the one or more sync symbols, such that the noise associated with one of the transmission lines is uniquely analyzed to facilitate dynamically adjusting the noise coefficients.

13. The system of claim 12, wherein a power at which one or more of the sync symbols are transmitted is selectively adjusted such that noise associated with one of the transmission lines is uniquely analyzed to facilitate dynamically adjusting the noise coefficients.

14. The system of claim 12, wherein the sync symbols repeat at a regular interval related to a number of respective transmission lines in the system.

15. The system of claim 12, wherein the sync symbols have data elements interspersed therebetween.

16. The system of claim 12, wherein the communication system comprises a DSL communication system.

* * * * *